(12) United States Patent
Patti et al.

(10) Patent No.: US 9,757,933 B2
(45) Date of Patent: Sep. 12, 2017

(54) PERFORMANCE ENHANCEMENTS FOR GLASS MATERIALS

(71) Applicant: Tom Patti Design, LLC, Pittsfield, MA (US)

(72) Inventors: Thomas J. Patti, Pittsfield, MA (US); Marilyn Holtz Patti, Pittsfield, MA (US)

(73) Assignee: Tom Patti Design, LLC, Pittsfield, MA (US)

( * ) Notice: Subject to any disclaimer, the term of this patent is extended or adjusted under 35 U.S.C. 154(b) by 169 days.

(21) Appl. No.: 14/541,899

(22) Filed: Nov. 14, 2014

(65) Prior Publication Data

US 2015/0165751 A1    Jun. 18, 2015

Related U.S. Application Data

(60) Provisional application No. 61/904,926, filed on Nov. 15, 2013.

(51) Int. Cl.
*B32B 38/08* (2006.01)
*B32B 37/10* (2006.01)
(Continued)

(52) U.S. Cl.
CPC .............. *B32B 38/08* (2013.01); *B32B 5/024* (2013.01); *B32B 17/10036* (2013.01);
(Continued)

(58) Field of Classification Search
CPC .............. B32B 38/08; B32B 2605/006; B32B 38/0012; B32B 37/10; B32B 2037/243; B32B 2419/00; B32B 27/12; B32B 2262/0246; B32B 2262/0269; B32B 2262/101; B32B 2262/103; B32B 2262/106; B32B 2307/54; B32B 5/024; B32B 17/06; B32B 37/003; B32B 37/02; B32B 2037/1223; B32B 2250/05;
(Continued)

(56) References Cited

U.S. PATENT DOCUMENTS

2014/0174641 A1* 6/2014 Roman ................ D03D 13/004
156/182

OTHER PUBLICATIONS

Bass, Milton; "Experiments in light, form, color," Berkshires Week (1996) pp. 9,10,24, Jul. 18-24, 1996.
(Continued)

*Primary Examiner* — Vishal I Patel
(74) *Attorney, Agent, or Firm* — Lerner, David, Littenberg, Krumholz & Mentlik, LLP

(57) ABSTRACT

Methods of manufacturing a layered glass element and various components of a layered class element, such as a pre-form assembly and a woven panel, are disclosed herein. These methods include the step of supplying a woven panel having a plurality of elongated strands woven into an open weave to define a first porous surface opposite of a second porous surface. A layer of interlayer material is applied to the first and second porous surfaces to encapsulate at least a portion of the woven panel within the interlayer material. These elements may be placed between a first and second layer of glass materials. A degree of pressure and heat is then applied for a first period of cure time to bond the interlayer material and the woven panel into either a pre-form assembly or a layered glass element.

8 Claims, 12 Drawing Sheets

(51) Int. Cl.
    *B32B 5/02*     (2006.01)
    *B32B 37/02*     (2006.01)
    *B32B 27/12*     (2006.01)
    *B32B 17/10*     (2006.01)
    *B32B 37/24*     (2006.01)
    *B32B 38/00*     (2006.01)
    *B32B 37/00*     (2006.01)
    *B32B 37/12*     (2006.01)

(52) U.S. Cl.
    CPC .... *B32B 17/10045* (2013.01); *B32B 17/1077* (2013.01); *B32B 17/10247* (2013.01); *B32B 17/10834* (2013.01); *B32B 27/12* (2013.01); *B32B 37/02* (2013.01); *B32B 37/10* (2013.01); *B32B 37/003* (2013.01); *B32B 37/24* (2013.01); *B32B 38/0012* (2013.01); *B32B 2037/1223* (2013.01); *B32B 2037/243* (2013.01); *B32B 2250/05* (2013.01); *B32B 2262/0246* (2013.01); *B32B 2262/0269* (2013.01); *B32B 2262/101* (2013.01); *B32B 2262/103* (2013.01); *B32B 2262/106* (2013.01); *B32B 2305/188* (2013.01); *B32B 2307/102* (2013.01); *B32B 2307/414* (2013.01); *B32B 2307/54* (2013.01); *B32B 2309/022* (2013.01); *B32B 2309/025* (2013.01); *B32B 2309/125* (2013.01); *B32B 2315/08* (2013.01); *B32B 2315/085* (2013.01); *B32B 2419/00* (2013.01); *B32B 2605/006* (2013.01); *Y10T 156/1002* (2015.01)

(58) Field of Classification Search
    CPC ........ B32B 2305/188; B32B 2307/102; B32B 2307/414; B32B 2309/022; B32B 2309/025; B32B 2309/125; B32B 2315/08; B32B 2315/085; B32B 37/24; Y10T 156/1002
    See application file for complete search history.

(56) References Cited

OTHER PUBLICATIONS

Patti, Thomas, "Architechtural Glass", Artguard® Technologies, artguard@aol.com, 1996.
Vallongo, Sally, "Built with an artist's touch," The Blade (1997), secton B, p. 7, Toledo, Ohio.
Patti, Tom, "Science into Sculpture," Montage Journal of Arts & Humanities, (1997) pp. 44-45.
Patti, Tom, "Contemporary Glass Sculpture," The Toledo Museum of Art (1997).

\* cited by examiner

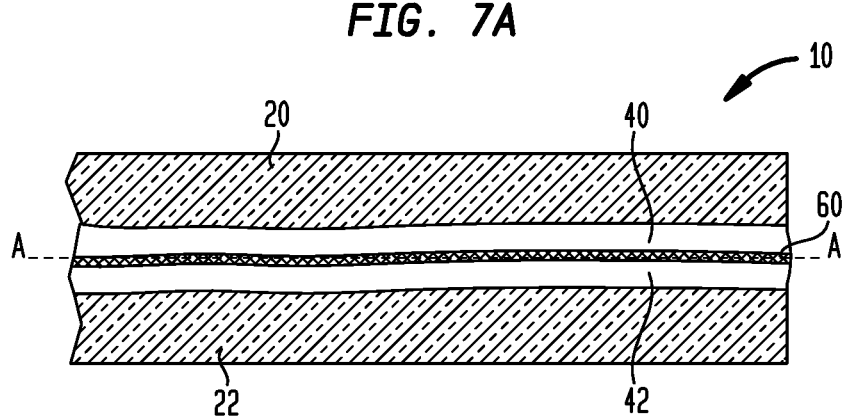
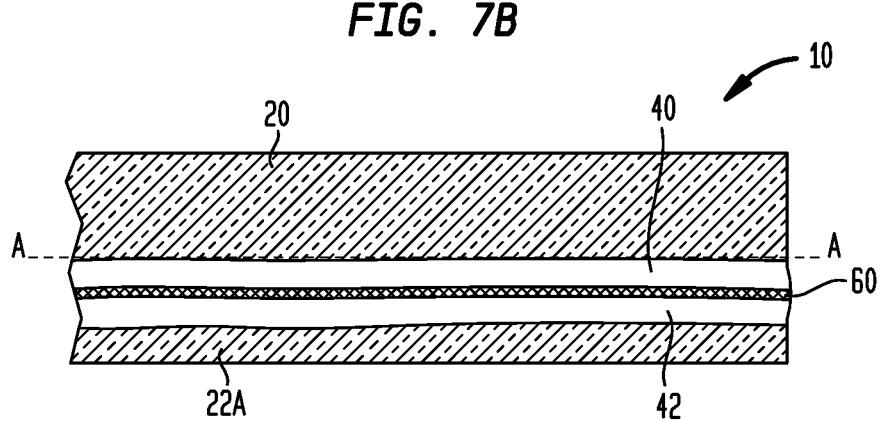

FIG. 10

| TOM PATTI DESIGN | | AUTOCLAVE RUN |
|---|---|---|

E.T. 2 HRS 36 MIN       PAGE NO. 9

| AUTOCLAVE SETTINGS | | TEMP 230 F | PRESS 120 | SOAK TIME 20 min | | | |
|---|---|---|---|---|---|---|---|

| | TIME | COUPONS | | | | AIR TEMP | PRESS | COUPON 1/2 | |
|---|---|---|---|---|---|---|---|---|---|
| | | 1 3/8 | 2 1/2 | 3 1/2 | 4 3/4 | | | OVEN SET TEMP | OVEN TEMP |
| START | 1:25 | 73 | 74 | 72 | 73 | 73 | 0-7 | 155 | 63 |
| START PRESS | 1:43 | 125 | 122 | 122 | 108 | 227 | 10 | 200 | 198 |
| PRESS OFF | 2:26 | 230 | 230 | 230 | 214 | 241 | 120 | 233 | 233 |
| START SOAK | 2:44 | 240 | 240 | 240 | 232 | 242 | 120 | 234 | 233 |
| START COOL DOWN | 3:04 | 241 | 240 | 240 | 237 | 240 | 120 | 232 | 232 |
| OFF | 3:59 | 114 | 113 | 114 | 130 | 89 | 90 | 232 | 84 |

NOTES:

FIG. 11

TOM PATTI DESIGN | AUTOCLAVE RUN

E.T. 2 HRS 25 MIN

PAGE NO. 7

AUTOCLAVE SETTINGS: TEMP 240 F | PRESS 120 | SOAK TIME 20 min

| | TIME | COUPONS | | | | AIR TEMP | PRESS | COUPON 1/2 | |
|---|---|---|---|---|---|---|---|---|---|
| | | 1 3/8 | 2 1/2 | 3 1/2 | 4 3/4 | | | OVEN SET TEMP | OVEN TEMP |
| START | 8:51 | 64 | 64 | 64 | 64 | 64 | 0-7 | 155 | 58 |
| START PRESS | 9:12 | 111 | 122 | 121 | 99 | 220 | 10 | 195 | 196 |
| PRESS OFF | 9:45 | 205 | 218 | 217 | 192 | 233 | 120 | 224 | 224 |
| START SOAK | 10:08 | 225 | 250 | -0- | 220 | 234 | 120 | 225 | 225 |
| START COOL DOWN | 10:30 | 230 | 230 | -0- | 226 | 229 | 130 | 222 | 222 |
| OFF | 11:17 | 130 | 117 | 117 | 140 | 89 | 97 | 222 | 45 |
| | 9:38 | 193 | 208 | 207 | 176 | 231 | 109 | 224 | 224 |

NOTES:

FIG. 12

TOM PATTI DESIGN    AUTOCLAVE RUN

E.T. 2 HRS 47 MIN    PAGE NO. 10

| AUTOCLAVE SETTINGS | TEMP 240 F | | PRESS 120 | | SOAK TIME 30 min | | | COUPON 1/2 | |
|---|---|---|---|---|---|---|---|---|---|
| | | COUPONS | | | AIR TEMP | PRESS | OVEN SET TEMP | OVEN TEMP |
| | TIME | 1 3/8 | 2 1/2 | 3 1/2 | 4 3/4 | | | | |
| START | 12:53 | 77 | 77 | 78 | 76 | 76 | 0-7 | 155 | 68 |
| START PRESS | 1:13 | 125 | 129 | 127 | 109 | 209 | 80 | 186 | 186 |
| PRESS OFF | 1:44 | 212 | 215 | -0- | 185 | 241 | 120 | 233 | 233 |
| START SOAK | 2:17 | 240 | 240 | -0- | 229 | 240 | 120 | 234 | 234 |
| START COOL DOWN | 2:47 | 240 | 240 | +0- | 237 | 240 | 120 | 233 | 233 |
| OFF | 3:40 | 118 | 118 | | 145 | 89 | 46 | 233 | 86 |

NOTES:

PERFORMANCE ENHANCEMENTS FOR GLASS MATERIALS

CROSS-REFERENCE TO RELATED APPLICATIONS

The present application claims the benefit of the filing date of U.S. Provisional Patent Application No. 61/904,926 filed Nov. 15, 2013, the disclosure of which is hereby incorporated herein by reference.

BACKGROUND OF THE INVENTION

A significant percentage of modern buildings and products are designed to incorporate decorative glass and plastic materials (collectively, "decorative glass materials" or simply "glass materials"). Moreover, most applications of glass materials are also required to meet certain performance standards, such as insulation, moisture control, lighting control, security, structural integrity, etc. Modern design trends suggest that glass materials will continue to play an important role well into the future.

Present modes for producing decorative glass materials have traditionally been limited to one of three applications.

First, glass materials can be manufactured by a specialized process that imparts certain qualities. For example, a glass panel may be produced by a float glass process that introduces additional elements, such as iron or other tinting medium, to produce glass materials with varied light transmittance. Likewise, a plastic panel may be imbued with dyes or pigments to achieve a desired color. Alternatively still, glass materials may be cut into a plurality of unique shapes for assembly into a larger shape, as with stained glass.

Second, the surface of a glass material can also be modified by some form of surface adornment, such as an etching, film, or paint on either the front or back of the glass. In some cases, these adornments may enhance the performance of the glass materials. For example, it is known that some window films can both enhance the decorative appeal of glass materials and modify their light transmittance properties when applied to the exterior surface of a window. In many other cases, however, surface adornments may reduce the performance of glass materials. For example, glass materials that are etched may lose a significant percentage of their strength because etched surfaces have a reduced ability to transfer surface tension. In either case, the long-term durability of surface adornments may be limited because the decorative elements are exposed to the destructive forces of man and nature.

And third, decorative glass materials may be produced by sandwiching a cloth, paper or silk element between two panes. For example, the pattern of glass materials may be modified by insertion of a silk screen print between two panes of clear float glass. Alternatively, the sandwiched element may also be comprised of a film made of polyvinyl butyral or polyurethane film. Like cloth, paper or silk, these films may also modify color; however, they can also have performance enhancing attributes. For example, a single sheet of polyurethane film may block 99% of incoming UV radiation, give the glass a much higher sound insulation rating by virtue of the dampening effect, and, depending on the materials and manufacturing processes, increase impact resistance.

Despite these enhancements, however, the use of sandwiched elements provides comparatively fewer design options than surface adornments. For example, a surface adornment, like an etching, may be applied to provide the glass materials with a desired visual texture, whereas a film may be unable to impart an equivalent visual texture because of its thin profile. Further, a surface adornment, like paint, may be composed with an infinite variety of colors, whereas a film may be chromatically limited by the chemical and physical demands of its manufacturing process.

Similarly, the performance enhancements provided by a sandwiched element are also limited by its physical properties. An interlayer of paper or silk, for example, may not be able to increase the strength of the glass materials because of its limited tensile strength. Likewise, the strength gains afforded to glass materials by a polyvinyl butyral or polyurethane film are also limited to the respective tensile strengths of those materials, even though stronger materials exist. In other respects, the strength gains of sandwiched elements are also limited by the cut resistance of the element. For example, breaking the float glass exterior panel attached to a polyrethene film exposes the film, which is easily cut even if designed to survive the window break.

Thus, despite the increased use of glass materials in modern design, the technologies available to provide concurrent aesthetic and performance enhancements remains limited. Therefore, new performance enhancements for decorative glass materials are needed; especially one that can both match the design options of known surface adornments and improve upon the performance enhancing capabilities of existing technologies.

SUMMARY OF THE INVENTION

This application discloses a number of enhanced glass material elements, as well as related systems and methods for using and making these inventions.

An aspect of present invention is a layered glass element comprising at least one woven panel encapsulated between an interlayer material and two layers of glass materials. Each element may be adapted to enhance the performance of the layered glass element. For example, the glass material layers and woven panel may be modified to increase the strength of the layered element or achieve like aim. Preferably, the woven panel is formed of a plurality of elongated strands woven to have an open weave pattern. Preferably still, the woven panel is coated with a binding agent to maintain the integrity of the open weave during assembly of the layered glass element. In some embodiments, a pre-stressing force may be applied to at least one strand of the woven panel and retained in the layered element by the interlayer material.

Another aspect of the present invention is a pre-form assembly adapted to simplify assembly of the layered element. In the pre-form assembly, at least a portion of the woven panel is encapsulated within the interlayer material prior to formation of the layered glass element. Preferably, the pre-form assembly is a flexible element that can be rolled into a rolled stock.

Yet another aspect of the invention is a woven panel comprising a plurality of elongated strands having a high tensile strength-to-weight ratio. The elongated strands may be woven into an open weave pattern and coated with a binding agent to maintain the integrity of the weave. Preferably, the open weave and the binding agent define a first porous surface opposite of a second porous surface, each surface being uniquely adapted to bond with the interlayer material. In some embodiments, the woven panel is comprised of a plurality of materially distinct elongated strands, any of which may be woven or otherwise arranged to provide the layered element with localized features. In other embodiments, the woven panel is made of a plurality of chopped fibers in a weave-like matrix.

Aspects of this invention also provide methods for manufacturing the inventions described above. For example, the method of manufacturing the pre-form in accordance with this aspect includes the step of supplying a supplying a woven panel having a plurality of elongated strands woven into an open weave. Preferably, the interstices of the open weave define a first porous surface opposite of and in communication with a second porous surface. A layer of interlayer material is applied to the first and second porous surfaces to encapsulate at least a portion of the woven panel within the interlayer material. A cycle of heating, pressurizing, and cooling off may be applied for a period of cure time to bond the woven panel and the interlayer material into a pre-form assembly. In some embodiments, this cycle may include the step of soaking the woven panel and interlayer material for a period of hold time so the interlayer material can permeate into at least a portion of the glass fibers in the plurality of elongated strands. Preferably, after this exemplary cycle is complete, the pre-form assembly has a low percentage of void volume and an exterior surface adapted to bond with the interlayer material.

Advantageously, aspects of the manufacturing methods disclosed herein may also be utilized to manufacture the layered glass element from the pre-form assembly. For example, the pre-form assembly may be encapsulated between additional layers of the interlayer material and at least two glass material sheets. A second cycle of heating, pressurizing, and cooling off may be applied to form a layered element containing the pre-form assembly. A soaking step may also be applied in this second cycle, like before, to further bone the exterior surface of the pre-form assembly with additional layers of interlayers material. Preferably all of the interlayer material, include the interlayer material contained within the pre-form assembly, is cured after completion of an embodiment of this second cycle.

Other methods are specific to the manufacture of a woven panel uniquely adapted for use within a layered glass element in accordance with the present invention. These methods includes the steps of supplying a plurality of elongated strands having a high tensile strength-to-weight ratio; weaving the plurality of elongated strands into a woven panel with an open weave; and applying a binding agent to the plurality of elongated strands to maintain the integrity of weave. Preferably, the open weave and the binding agent define a first porous surface opposite of a second porous surface, each surface being adapted to bond with the interlayer material upon application of cycle of heating, pressurizing, soaking, and cooling off. As described below, the composition and arrangement of the elongated strands may be modified to manufacture a woven panel adapted to enhance the performance of glass materials. For example, the woven panel may be formed of a plurality of elongated strands that are intersected to form a weave-like matrix with localized features, such as openings to modify light transmittance and defined structural members that span along an axis of the element to distribute forces from the center of the layered glass element to the perimeter.

Methods of manufacturing the pre-stressed embodiments of the layered glass element are also disclosed. In these methods, a pre-stressing force is applied to a portion of the woven panel and then removed after the pre-stressed portions of the woven panel have been captured within the interlayer material. Advantageously, this permits the pre-stressing force to be retained within the layer element by virtue of the bond formed between the cured interlayer material and the elongated strands of the woven panel, thereby increasing the flexural strength of the layered element. In some embodiments, the tensile strength of the pre-stressed elongated strands is fully developed by the interlayer materials; whereas, in other embodiments, an internal or external frame is deployed to evenly distribute any bending forces within the element.

BRIEF DESCRIPTION OF THE DRAWINGS

FIG. 7A is profile view of an embodiment of the invention that shows the relative thickness of each layer of glass materials.

FIG. 7B is a profile view of an alternate embodiment of the invention depicted in FIG. 7A.

FIG. 10 is a first explanatory chart of the autoclave settings used to manufacture another embodiment of the invention.

FIG. 11 is a second explanatory chart of the autoclave settings used to manufacture another embodiment of the invention.

FIG. 12 is a third explanatory chart of the autoclave settings used to manufacture another embodiment of the invention.

DETAILED DESCRIPTION

The present invention is directed to a performance enhancing system for glass materials that can be used commercially or residentially to produce automotive glass, doors, furniture, lamps, lighting fixtures, windows, and like products.

Figure 1:
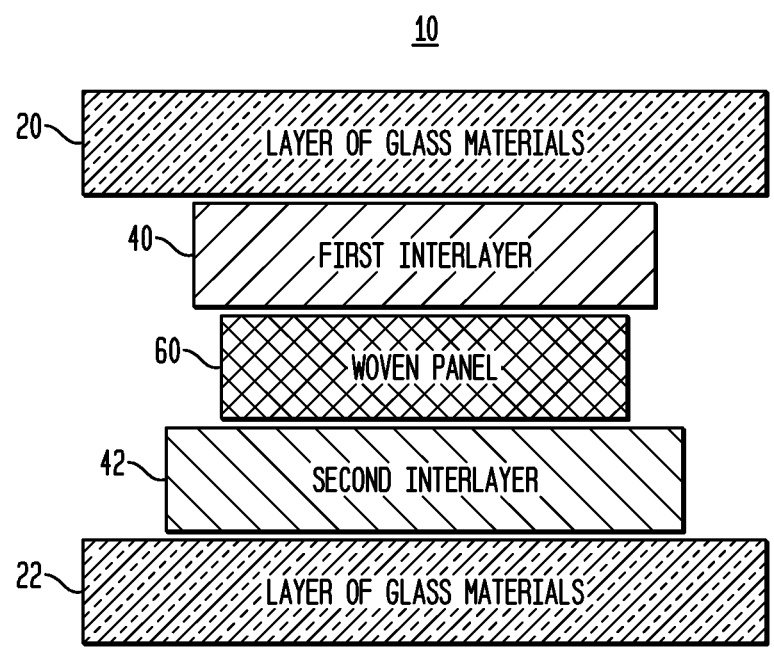
FIG. 1 is a cross-sectional view of an embodiment of the invention.

As shown in cross-sectional view provided by FIG. 1, a preferred embodiment of this system comprises at least two layers of glass materials 20, 22 are adhered to at least one woven panel 60 by a first and second interlayer 40, 42. It should be noted the first and second interlayer 40, 42 shown in FIG. 1 may be comprised of a single application of interlayer material, depending upon the porosity of the at least one woven panel 60. A multi-layered glass element may also be formed with additional layers of glass materials, such as layers 120, 122, and 124, adhered together with a plurality of additional woven panels 160, 162, and interlayers 140, 142, 144, 146, as further shown in FIG. 2.

Figure 4:
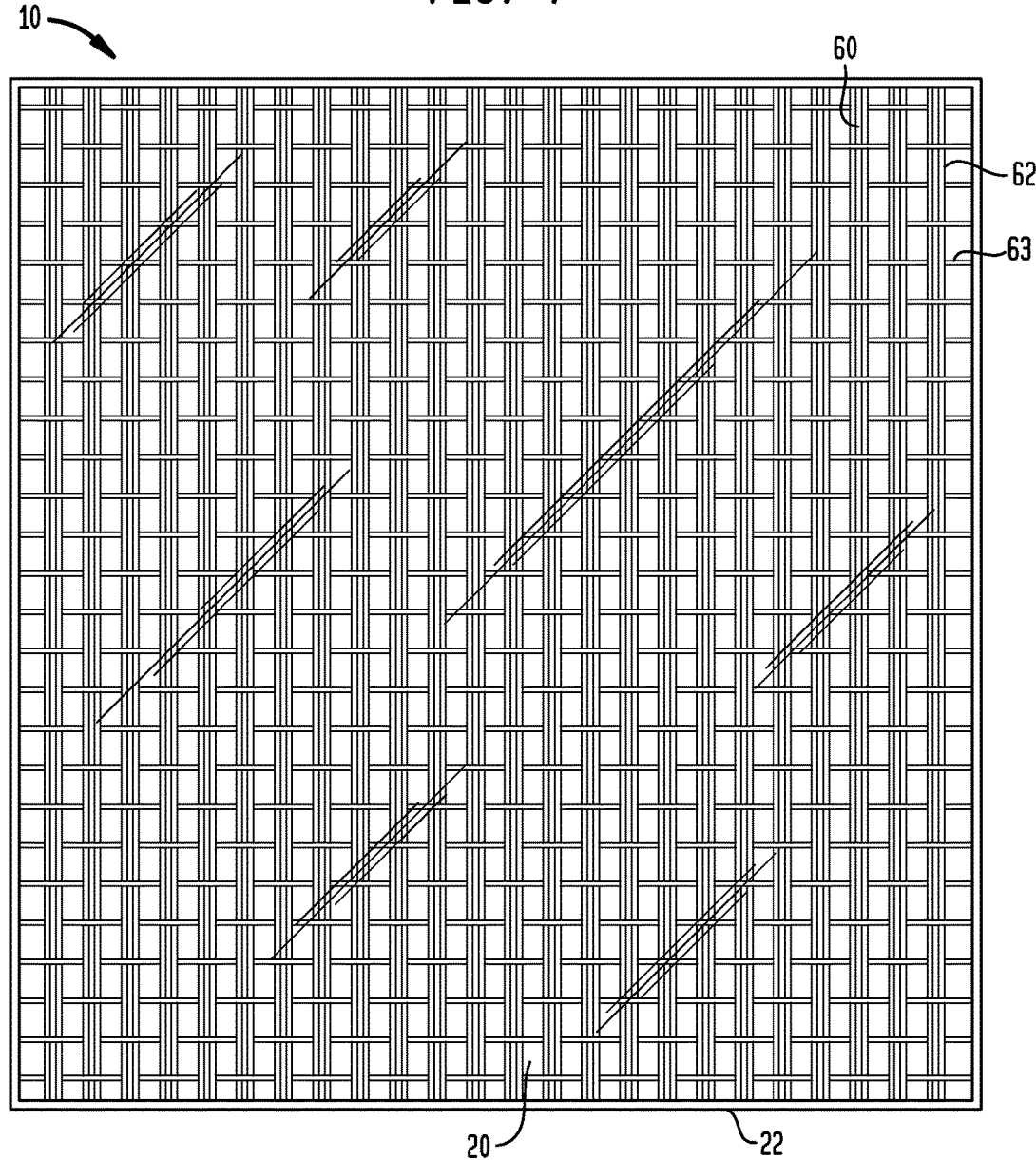
FIG. 4 depicts a layered glass element in accordance with the invention.
Figure 8:
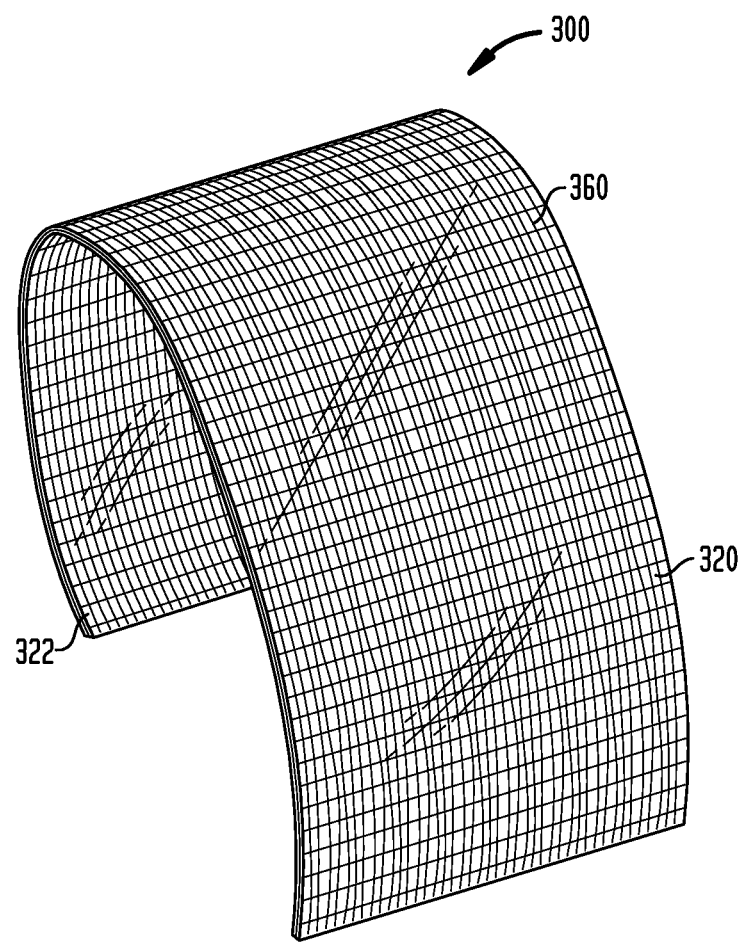
FIG. 8 is a perspective view of a curved embodiment of the invention.

It should be appreciated that the at least two layers of glass materials may be rigid, semi-rigid, or any combination thereof. For example, as best shown in FIGS. 4-6, both layers of glass materials 20, 22 may be rigid, wherein the resulting layered glass element 10 may obtain a degree of rigidity superior to that of each individual layer of glass materials 20, 22. In this configuration, for example, the thickness of at least two layers 20, 22 may thus be determined by variables such as the edge support conditions and desired structural integrity. Alternatively, as best shown in FIG. 8, both layers of glass materials 320, 322 may be flexible so the resulting element 300 may obtain a degree of flexibility approximate to that of each individual layer 320, 322. In this configuration, similar to above, the thickness of the at least two layers 320, 322 may thus be determined by variables such as the desired amount of plastic deformation that can be obtained by known molding techniques; such as, for example, coldforming or thermoforming.

Figure 2:
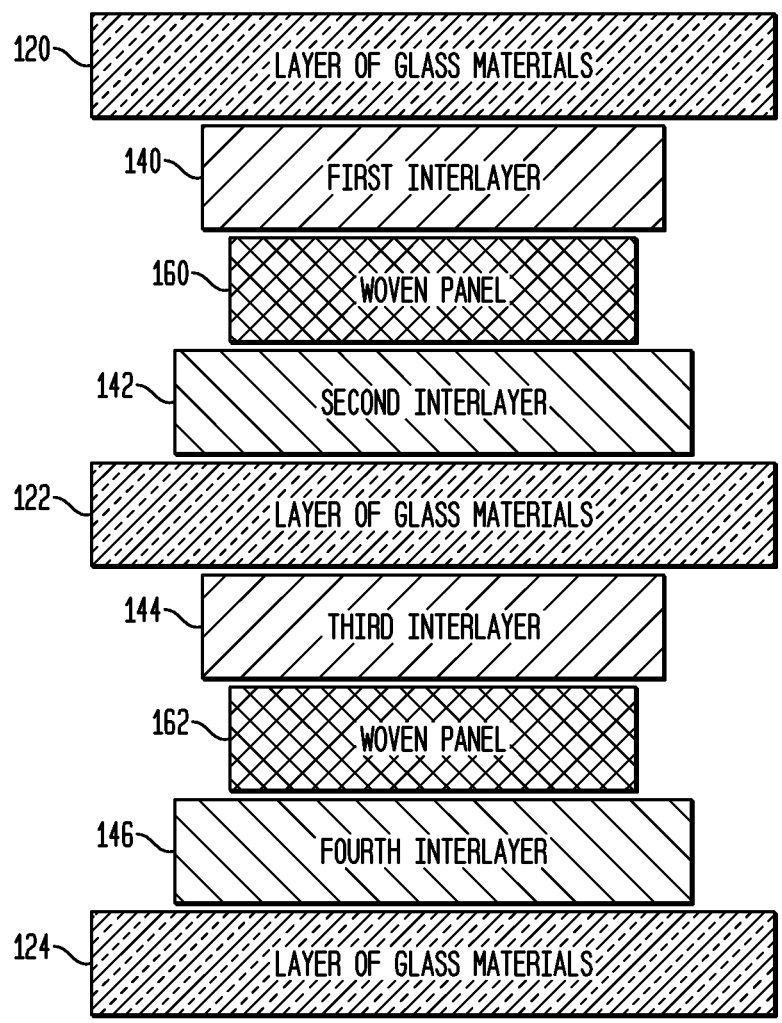
FIG. 2 is a cross-sectional view of an alternate embodiment of the invention.

Alternatively still, the rigidity of each of the at least two layers of glass materials 120, 122, 124, may vary, for example, to reduce manufacturing costs or permit the addition of at least a second woven panel 162 of fiber strands surrounded by a third and fourth interlayer 144, 146 as illustrated in FIG. 2. As another example, the rigidity of each of the at least two layers of glass materials may vary along the length and width of each panel in regular or irregular shape. In some embodiments, rigidity may be defined with respect to a conical shape emanating from, for example, a central point on the interior surface of either of the at least two layers to define a curved interior space between the layers. In other embodiments, the rigidity may be defined with respect to an interior surface shaped as a pyramid, quadrilateral, spheroid, or like geometrical shape, which may be level, sloped, or terraced as needed. In still others, the interior surfaces of the interior space may be pocked or undulating to permit placement of at least a second panel in a localized or patterned manner to modify light transmittance, as in FIG. 5.

The first and second interlayers 40, 42 in FIG. 1, for example, may comprise any interlayer material or adhesive medium adapted to bond with the glass materials and woven panels described herein under heat or pressure. For example, the interlayers may be comprised of any resin or film made from at least one member of a group consisting essentially of thermoplastic polyurethanes ("TPUs"), polyvinyl butyral ("PVB"), ethylene-vinyl acetate ("EVA"), or any other interlayer material with comparable properties. Likewise, woven panel 60 in FIG. 4 may be comprised of any material that can be formed into an elongated fiber strand, like strands 62 and 63, which can be woven or flat before being woven into a panel 60. For example, elongated strands 62, 63 may be formed from at least one member of a group consisting essentially of acrylic, carbon, copper, glass, gold, Kevlar, plastic, steel, any other material which can be processed to form an elongated, fiber-like element, and a combination thereof. Woven panel 60 may be comprised of either a single type of fiber strand or a plurality of types, woven by any weave method, depending upon the desired performance enhancements. Preferably, each fiber strand has a high tensile strength-to-weight ratio.

In accordance with the disclosed invention, strands 62, 63 may also be coated with a binding agent (not shown) that helps to maintain the integrity of the weave. The binding agent may be, for example, a starch based liquid that provides adequate adhesion between each fiber strand like strands 62, 63. Preferably, the binding agent is clear. Alternatively, the binding agent may be adapted to enhance the performance of the glass materials, for example, by altering color, improving interlayer adhesion and structural integrity, or modifying light transmittance properties. Some of these enhancements may be physical, for example, where the binding agent serves to arrange portions of the woven panel in a particular arrangement; others may be chemical, wherein the binding agent is reacts with the interlayer material to alter the light transmittance of localized portions of the layered glass element.

In some embodiments, woven panel 60 is a weave-like matrix produced, for example, by use of chopped fiber, fiber wrap, or similar material. In an exemplary embodiment, the individual chopped fibers may be intersected in a regular or irregular form to form the weave-like matrix. Like the binding element, each element of the weave-like matrix may be further adapted to enhance the performance of glass materials. For example, each element in the weave-like matrix may be coated with reflective or non-reflective coatings that enhance energy conservation, light control, and tensile strength. In addition to those described herein, exemplary application methods for coating the individual elements of the weave-like matrix might include pyrolytic, vacuum deposition, sputter coated, or like methods. As yet another example, a plurality of the strands in the weave-like matrix may be arranged to define at least one thickened structural member that spans along an axis of the perimeter. This member may, for example, span the axis in a regular or irregular manner to transmit forces from the centralized portions of the exterior surface of at least one side of layered glass element 10 to the edges of the element.

The exemplary layered glass element 10 in FIG. 4 has a woven panel of glass fiber strands 62, 63 selected to obtain a desired visual texture, mitigate the presence of invasive sound and light, and increase impact resistance. Advantageously, the arrangement of each of the plurality of glass fibers 62, 63 may be transformed as element 10 is manufactured to further enhance these properties. For example, application of pressure and heat may fan out the individual glass fibers that compose each elongated fiber strand 62 and to increase the light transmittance of element 10. Of course, elongated strands 62 and 63 may be composed of any material that can be incorporated into the woven panel in accordance with this application. In some embodiments, the desired characteristics may be provided by the individual glass fiber strands; while in others, the desired characteristics may be obtained by further adapting the strands or the orientation of the strands as described above.

Figure 5A:
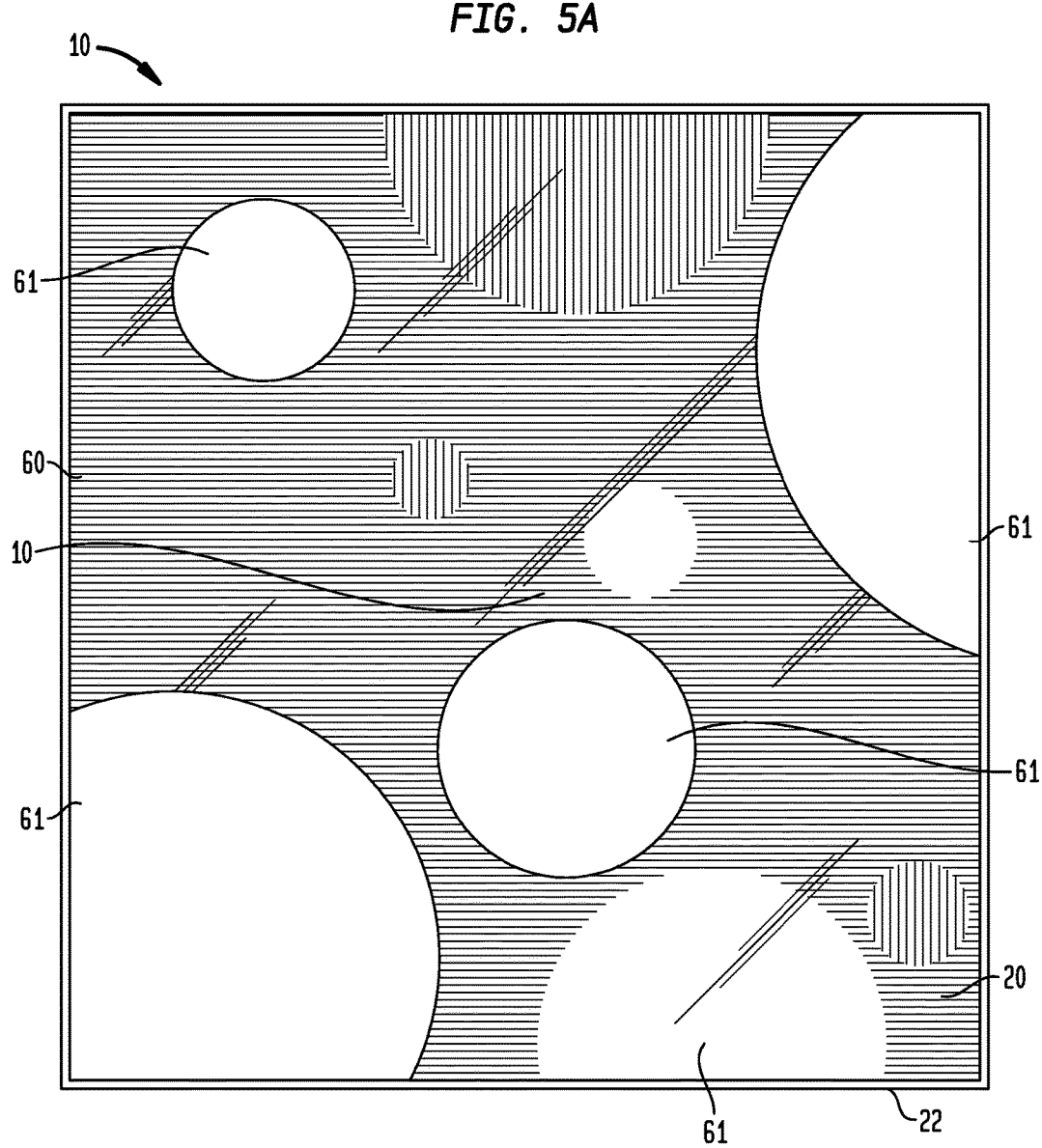
FIG. 5A depicts an alternate embodiment of the element depicted in FIG. 4, wherein the woven panel has been disrupted to define a plurality of openings.
Figure 5B:
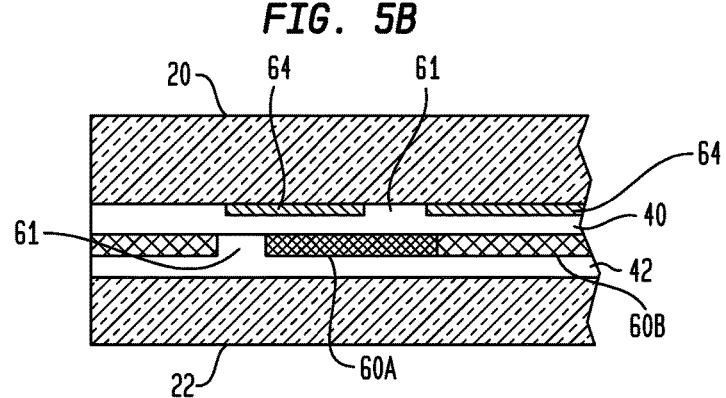
FIG. 5B depicts an exemplary cross-section of the alternative embodiment of FIG. 5A.
Figure 6A:
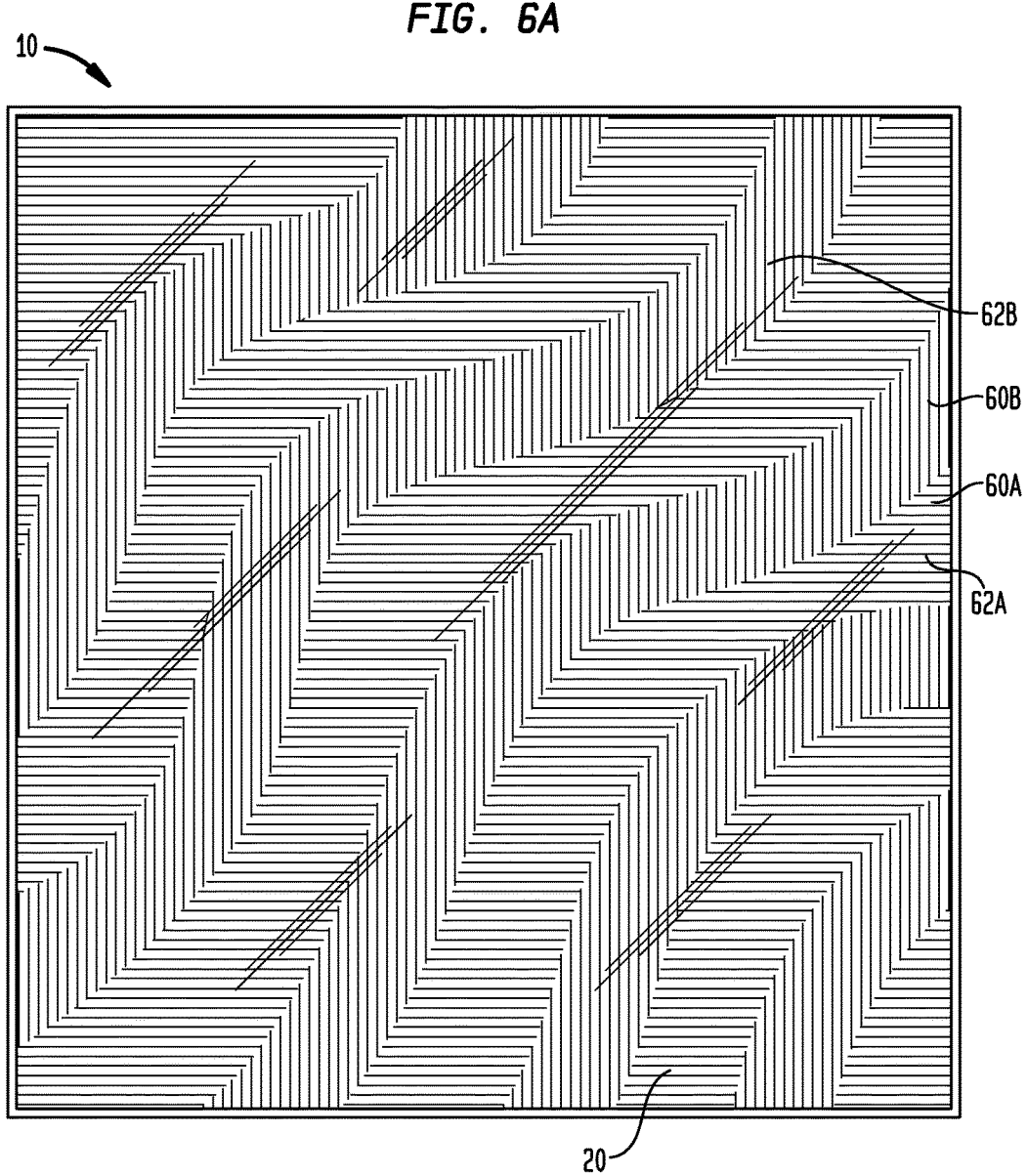
FIG. 6A depicts an alternate embodiment of the element depicted in FIG. 4, wherein the woven panel has a first portion and a second portion.
Figure 6B:
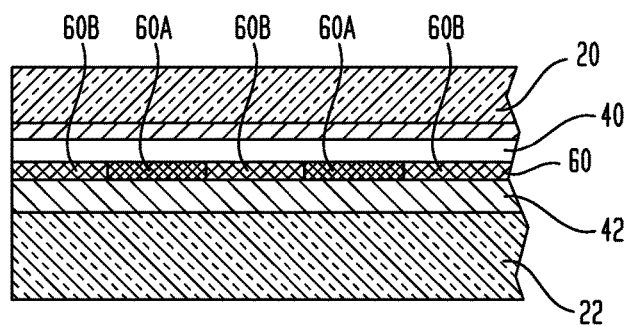
FIG. 6B depicts an exemplary cross-section of the alternative embodiment of FIG. 6A.

The desired performance characteristics may also be localized. In FIGS. 5A-B, for example, the plurality of elongated strands comprising woven panel 60 have been disrupted to define a plurality of openings 61 in the pre-form assembly. Some of openings 61 are translucent create an integral window in the element 10 that permits sight through panels 20 and 22. Other localized features are also contemplated. For example, a portion of the woven panel 60 may be comprised of a first portion 60A and a second portion 60B. Using portions 60A and 60B allows for the combination of multiple strand types within a single panel 60. In some embodiments, first and second portions 60A and 60B allow for a combination of carbon fiber and Kevlar strands selected to make at least a portion of the layered glass element bullet-resistant. Alternatively, the woven panel may include strands of copper fibers, or other conductive material, for attachment to a glass break sensor. Alternatively still, the conductive material may be interwoven with strandlike solar cells to produce an electricity generating window for a commercial building. Even further, the conductive material may be magnetized to produce a magnetic window, or replaced with fiber optic cable to produce a visually stimulating window with data transmission capabilities. In either instance, the conductive material may also be further adapted, for example, to act as an electrical insulator. Likewise, any of these alternative materials may also be placed in the opening to create a localized feature. For example, as shown in FIG. 5B, an interior surface of the first layer of glass materials 20 is has a reflected coating 64 aligned with one of the holes 61 to give layer 20 an unique reflective quality when viewed through hole 61. Based upon these examples, it should be understood that a large variety of embodiments of the disclosed invention are possible because any fiber-like strand with a desired set of performance attributes may be incorporated into the woven panel.

The strength of layered glass element 10 may also be increased in accordance with this invention by varying the width of the least two layers of glass materials 20, 22 and, thus, the resulting depth of the woven panel 60. The width of panels 20, 22 is approximately equal in FIG. 7A, which places the woven panel at the central axis A-A of element 10. Alternatively, as shown by the exemplary illustration in FIG. 7B, an exterior panel 20 of the element 10 may be thicker than the interior panel 22A to ensure placement of the woven panel at a depth D below central axis A-A. As a result, because the compressive strength of many glass materials exceeds their tensile strength, element 10 can withstand a greater exterior force because woven panel 60 is positioned to absorb more of the tensile components of the exterior force. Advantageously, this may result in a building window, for example, that is relatively easy to break from the inside to permit escape, yet incredibly difficult to break from the outside to preclude forced entry. Advantageously still, the element 10 may also have a higher cut resistance, for example, when the woven panel is comprised of Kevlar or like materials.

Other embodiments are also contemplated as being part of the present invention. For example, the rigidity of interior surface of each of the at least two layers of glass materials 20, 22, in FIGS. 7A-B for example, may be defined with respect to an interior spaced between the layers that permits the depth of the woven panel, or panels, to vary across the layered glass element as an element offset from the interior space. As an additional example, further layers of the woven panel may also be inlaid into a pattern corresponding with the localized or patterned surfaces of each layer of glass materials to further enhance its capabilities, as shown in FIG. 6, which depicts a first portion 60A of woven panel 60 having elongated strands 60A that intersect with the elongated strands 60B of a second portion 60B of woven panel 60.

Alternatively still, depending upon the base materials, a portion of either one or both of the warps and wefts of the woven panel may be pre-stressed to further enhance the strength of the layered glass element while also permitting a corresponding reduction in the thickness of each glass material layer. Exemplary depictions of these embodiments are provided in FIGS. 9A-B as layered element 400. Preferably, the bond forged between the pre-stressed portions 465 of the woven panel 460 and the interlayers 440, 442 is sufficient to develop at least some of the tensile capacity of pre-stressed portions 465 of the woven panel 460. For example, the high levels of abrasion resistance, tear strength, and compressive strength of a cured interlayer of TPU material is sufficient to permit a transfer of tensile forces within element 400 between the exterior surface of portions 465 and the interior surface of panels 420 and 422. By virtue of this configuration, the pre-stressing force may be retained within the layered element 400 by the interlayer material to structurally enhance element 400.

Figure 9A:
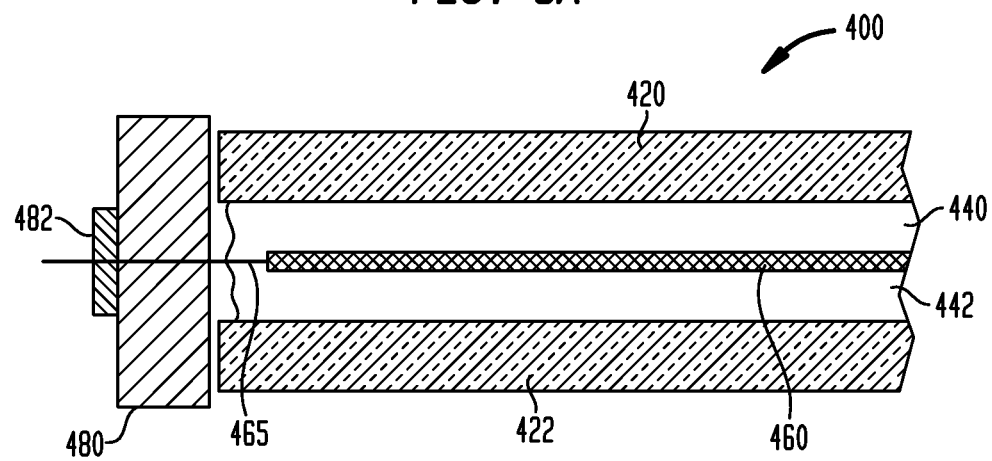
FIG. 9A is a cross-sectional view of an embodiment of the invention having pre-stressed strands.
Figure 9B:
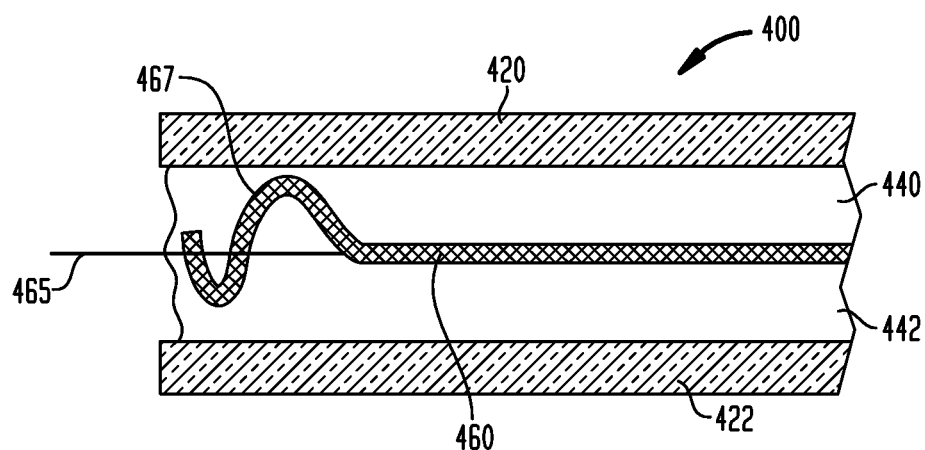
FIG. 9B is a cross-sectional view of an alternate embodiment of the invention depicted in FIG. 9A.

In some embodiments, as in FIG. 9A, the edges of woven panel may be affixed to a frame element 480 with a retainer 482 adapted to both retain the pre-stressing force until layers 440, 442 of interlayer material have sufficiently cured, and permit the transfer of forces within element 400. For example, retainer 482 may be an affixing screw used to secure the pre-stressed portions of the woven panel to the frame element at regular intervals along an edge of the layered glass element. As another example, FIG. 9B shows that a portion of woven panel 460 may be folded adjacent the pre-stressed portion 465 and then solidified by the cured intermixing material to define an internal ledge 467 adapted to evenly distribute the pre-stressing force within element 400. For example, pre-stressed portion 465 may be separated from, extended through, and then affixed to internal ledge 467 before interlayers 440, 442 are cured. Similar to above, this may result in window, for example, with variable breaking strengths; but in contrast to above, the pre-stressing may also permit the utilization of glass materials with a reduced thickness, such as Gorilla Glass®, sapphire glass, and other comparatively thin glass compositions.

Several methods of manufacture are also contemplated as being part of the disclosed invention; although a person skilled in the art would realize that these method steps may be varied to manufacture the any embodiment of the present invention that has been described in this application.

A first embodiment of these manufacturing methods results in element 10 of FIG. 1. To make element 10, the first layer 20 of the at least two layers of glass materials 20, 22 is laid flat. Once so positioned, first interlayer 40 is applied to layer 20 as either a resin or a film. Next, a woven panel 60 in accordance with this application is arranged in a substantially planar manner on top of the first interlayer 40. A second interlayer 42 is then applied to woven panel 60, also as either a resin or a film. After which, a second layer 22 of the at least two layers of glass materials 20, 22 is laid flat on top of the above elements. By virtue of these method steps, and their equivalents, woven panel 60 is encapsulated between the interlayer material 40, 42 and at least two layers of glass materials 20, 22. In an alternate embodiment, the plurality of interlayers shown in FIGS. 1 and 2 may also be formed by application of a single interlayer resin or film 40, depending upon the porosity of the at least one woven panel 60 and the characteristics of the interlayer material.

Once the above elements are assembled, a compressive force is preferably applied to the element 10 to remove any air bubbles from the interlayers 40, 42 or to otherwise ensure an even distribution of the interlayer material. Advantageously, however, it should be noted that neither removal of air bubbles nor even distribution of the interlayer material is required because the resulting inconsistencies may also enhance the performance of the glass materials. For example, an alternative method may include the step of inducing bubbles into interlayers 40, 42 to create unique refraction patterns or improve the insulating qualities of the layered glass element.

As a potential final step, the assembled parts of element 10 are preferably placed into an autoclave; although any comparable device that is capable of applying heat, pressure, or equivalent forces may also be used, such as the forces applied by infrared, oven, press, infrared, or vacuum technologies. Additional manufacturing steps are also possible.

For example, as illustrated in FIG. 2, additional layers of glass materials 124 may be applied along with a plurality of additional woven panels 162 and additional interlayers 144, 146.

The method steps disclosed above may also be varied to impart localized enhancements into the layered glass element. For example, a portion of the woven panel 60 may be disturbed or otherwise modified before assembly to create an opening 61, similar to that in FIGS. 5A-B, which has reflective element placed in some of the openings 61. Advantageously, the layering of woven panels may enhance a number of visual performance characteristics by refracting the light as it flows through the layered glass element. In another embodiment, portions 60A and 60B of woven panel 60 may be aligned during assembly to form a desired visual pattern, as best illustrated by the curvilinear pattern of element 10 in FIGS. 6A-B. Alternatively, the thickness of either portion 60A or 60B in FIGS. 6A-B may be thickened to form at least one structural member that spans along an axis of element 10. Alternatively still, any portion of woven panel 60 may be interwoven with or substituted for another, for example, to permit only a portion of element 10 to retain a high-performance characteristic, such as bullet resistance.

In still yet another embodiment, the first layer 20 of the at least two layers of glass materials 20, 22 may be affixed to a frame prior to assembly. For example, as in FIG. 9A, if a pre-stressing force is to be applied, then the warps and wefts of the woven panel 460 may be affixed to a frame 480; and pre-stressed before or after the interlayer material is applied to either secure element 400 to frame 480 or enhance the structural capabilities of element 400. Further still, a portion, such as the edges, of the woven panel 460 may also be folded to form an integral frame or ledge 467, which may be used to both retain and evenly distribute the pre-stressing forces described above.

After the elements have been assembled in accordance with any variation of the above steps, the assembled parts may, for example, be inserted into an autoclave and processed through a cycle of heating, pressurizing, soaking, and cooling off. The variables of this process, such as time, temperature, and pressure, are dependent upon the materials comprising the at least two layers of glass materials 20, 22 adhered to at least one woven panel 60 by a first and second interlayer 40, 42. Moreover, it should be noted that these settings are also dependent upon the desired appearance and performance attributes of the finished product because the woven panel may be altered by application of heat and pressure, as discussed below.

FIG. 10 provides an illustrative example of the autoclave settings utilized to manufacture an embodiment like that of FIG. 1 in accordance with this application. It should be appreciated that the exemplary settings depicted in FIG. 10 are not intended to limit this disclosure with respect to any of the alternate embodiments or manufacturing methods discussed herein, including those which may not even require the use of an autoclave. For example, the autoclave settings shown in FIG. 10 are specific to the manufacture of a layered glass element 100 comprising of two layers of 3/8" thick clear float glass and a woven glass fiber panel surrounded by a first and second TPU interlayer; although similar settings may be applicable to any type of glass material, interlayer, or woven panel. As shown, the autoclave settings for this embodiment are configured to a maximum temperature range of about 200 to degrees Fahrenheit, a maximum pressure of about 120 pounds per square inch, and a soak or hold time of about 30 minutes.

Adjustments to these variables may alter woven panel 60 and, thus, the appearance and performance attributes of the element 100. In FIG. 6, for example, a slight change in transmittance becomes visible in response to an increase in pressure and temperature, despite the use of two similar woven panels. In other embodiments, the woven panel may remain unaltered by the manufacturing process.

Similarly, a number of variations on the above manufacturing steps are also contemplated in accordance with any embodiment of the disclosed invention. For example, a molding step is envisioned as a means for forming the layered element into an angular and curvilinear shape for use in furniture or product applications, as shown in FIG. 8. As another example, electrical ports or other holes may formed into the layered element as a means for leveraging the enhanced capabilities of a particular woven panel. As yet another example, either of the at least two layers of glass materials may be formed from a plurality of unique shapes for assembly into a multi-colored or multi-textured window with any of the performance enhancements disclosed herein.

Figure 3:
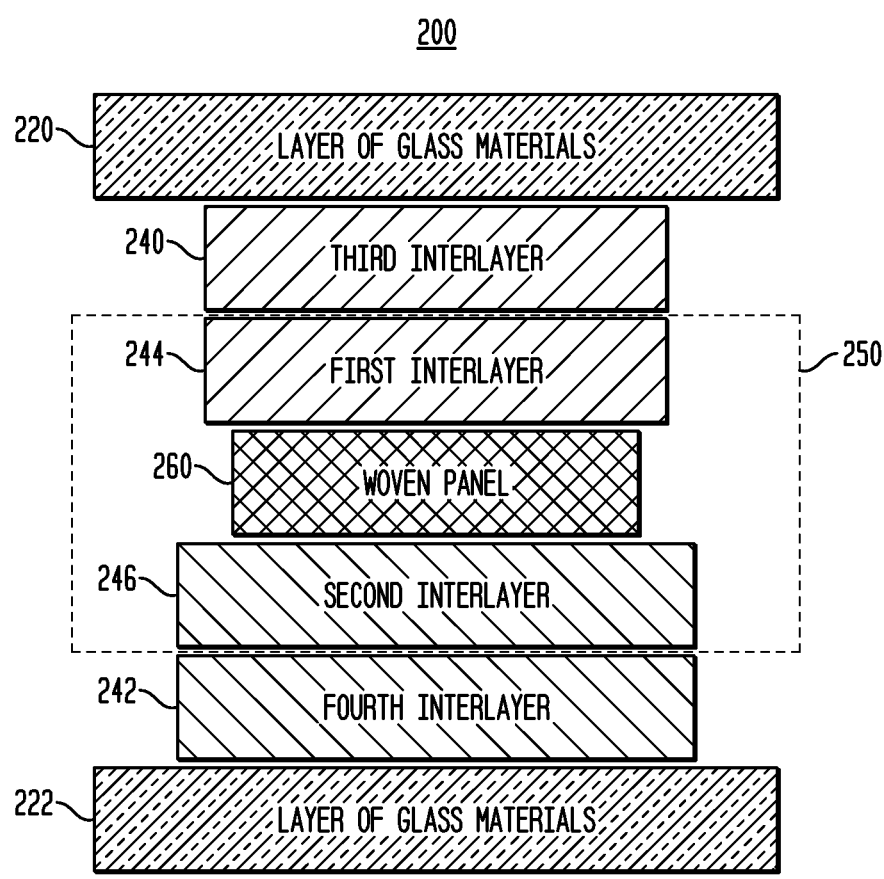
FIG. 3 is a cross-sectional view of another alternate embodiment of the invention.

In another embodiment of the disclosed manufacturing process, a first interlayer 244 and second interlayer 246 may be first adhered to a woven panel 260 to create a pre-form assembly 250, as best shown by the end product 200 illustrated in FIG. 3. Similar to above, at least a portion of the woven panel 260 is encapsulated within the interlayer material and then processed through a cycle of heating, pressurizing, soaking, and cooling off to form pre-form assembly 250.

The advantage of this embodiment is that element 200 may be formed with the pre-form assembly 250 without having to spend the time necessary to remove any air bubbles from the third or fourth interlayers 240 or 242, or to otherwise ensure an even distribution of the interlayer material. This distinction is especially important when the woven panel 260 is comprised of materials that must be forcibly coerced into a substantially planar position, such as steel strand that has emerged from a spool; or when the interaction of two dissimilar materials promotes an uneven distribution of the interlayers, which may result from the surface undulations of a carbon fiber and Kevlar weave. Furthermore, each pre-form assembly 250 may also be mass-produced and then rolled into rolled stock that can be later laid up into the terminal form in the autoclave. Because some interlayer materials have intermediate curing stages, pre-form assembly 250 may be first cured to a flexible stage for handling so that the final cure may be completed when the layered glass element is finished in accordance with below.

To achieve the embodiment illustrated in FIG. 3, first interlayer 244 is preferably applied as either a resin or a film. Woven panel 260 is arranged in a substantially planar manner on top of the interlayer 244. Once arranged, second interlayer 246 is applied to the woven panel 260, also as either a resin or a film, to encapsulate at least a portion of the woven panel 260 within interlayer 244 and 246. Similar to above, the assembled elements are placed into an autoclave (or like device) and processed through a cycle of heating, pressurizing, soaking, and cooling off (or equivalent process) to form the pre-form assembly 250. Preferably, this cycle provides pre-form assembly 250 with a low percentage of void volume and an exterior surface adapted to bond with the interlayer material. For example, the exterior surface of pre-form assembly 250 may have a smooth or dimpled surface to promote interlayer adhesion. As before, the autoclave settings, such as time, temperature, and pressure, are dependent upon the selected materials; however, these settings may be further altered in this embodiment because glass panels 220, 22 are not yet positioned to absorb any heat and pressure.

Similar to above, these method steps may be altered to achieve a desired level of performance. For example, portions of woven panel 260 may be pre-stressed within pre-form assembly 250 in accordance with any of the embodiments discussed above. As another example, the plurality of interlayers may also be formed by application of a single interlayer resin or film 244, depending upon the porosity of woven panel 250 and the characteristics of the interlayer material. After processing, the resulting pre-form assembly may then be stored for later use. Alternatively, the pre-form assembly may be formed into layered glass element 200 using substantially the same process set forth, in combination with any of the alternate steps set forth above, to achieve any embodiment disclosed.

A method of manufacturing a woven panel adapted for use within a layered glass element is also disclosed in this application. Preferably, the woven panel is formed from a plurality of elongated strands that have a high tensile strength-to-weight ratio. Once supplied, the plurality of strands are woven into a woven panel with an open weave. A binding agent is applied to the plurality of elongated strands to maintain the integrity of weave. In concert, the open weave and the binding agent define a first porous surface opposite of a second porous surface, each surface being adapted to bond with an interlayer material upon application of a degree of pressure and heat. FIGS. 10-12, for example, illustrate various autoclave settings that may be used in accordance with these methods to apply the degree of pressure and beta. Preferably, both surfaces are irregularly shaped to promote interlayer adhesion.

As described above, a portion of the plurality of elongated strands may be materially distinct form another portion. Therefore, the above methods may include the step of weaving the first and second portions to define a localized feature in the layered glass element. Alternatively, plurality of elongated strands may comprise a plurality of chopped fibers. Thus, the step of loosely weaving the plurality of chopped fibers may comprise the step of intersecting the chopped fibers within a perimeter to form a weave-like matrix. Elements of this weave-like matrix may also be arranged to enhance the performance characteristics of the layered glass element. For example, this method may include the step of shaping a portion of weave-like matrix to form thickened structural member that spans along an axis of the perimeter to reinforce the layered glass element once the interlayer is cured. Alternatively, this method may include the step of covering at least a portion of the woven panel with a composition adapted to modify the light transmittance properties of the woven panel. For example, at least a portion of the woven panel may be coated with a reflective film adapted to decrease the light transmittance properties of the woven panel. The exemplary autoclave settings in FIGS. 10-12 may, of course, also be modified to accommodate any of these alternative materials.

Although the invention disclosed in this application has been described with reference to particular embodiments, it is to be understood that these embodiments are merely illustrative of the principles and applications of the present invention. Accordingly, numerous modifications may be made to the illustrative embodiments, and other arrangements may be devised, without departing from the spirit and scope of the invention disclosed in this application.

The invention claimed is:

1. A method of manufacturing an element comprising:
   supply a woven panel having a plurality of elongated strands woven into an open weave to define a first porous surface opposite of a second porous surface;
   applying a layer of interlayer material to the first and second porous surfaces to encapsulate at least a portion of the woven panel within the interlayer material;
   applying a first degree of pressure and heat for a first period of cure time to bond the interlayer material and the woven panel into a pre-form assembly,
   wherein the pre-form assembly has a low percentage of void volume and an exterior surface adapted to bond with the interlayer material after the first period of cure time;
   encapsulating the pre-form assembly between additional layers of the interlayer material and at least two glass material sheets; and
   applying a second degree of pressure and heat for a second period of cure time to bond the additional interlayer material to the pre-form assembly and the at least two glass material sheets,
   wherein all of the interlayer material is cured after the second time period.

2. The method of claim 1, further comprising soaking the woven panel and the interlayer material for a first period of hold time to permit the interlayer material to penetrate a portion of the first and second porous surfaces.

3. The method of claim 2, further comprising disrupting the plurality of elongated strands prior to applying the interlayer material to define an opening in the pre-form assembly.

4. The method of claim 3, further comprising placing an element in the opening prior to applying the interlayer material to define a localized feature of the pre-form assembly.

5. The method of claim 1, wherein the pre-form assembly is flexible after the first period of cure time.

6. The method of claim 5, further comprising rolling the pre-form assembly into a rolled stock.

7. The method of claim 1, further comprising disrupting the pre-form assembly prior to applying the interlayer material to define at least one opening in the pre-form assembly.

8. The method of claim 7, further comprising placing an element in the at least one opening prior to applying the second layer of interlayer material to define a localized feature of the multilayered element.

\* \* \* \* \*